United States Patent [19]

Remus

[11] Patent Number: 4,821,444

[45] Date of Patent: Apr. 18, 1989

[54] HUNTING DECOY

[76] Inventor: David R. Remus, P.O. Box 33427, St. Paul, Minn. 55144-1000

[21] Appl. No.: 126,747

[22] Filed: Nov. 30, 1987

[51] Int. Cl.$^4$ ............................................. A01M 31/06
[52] U.S. Cl. ............................................................. 43/2
[58] Field of Search ........................................... 43/2, 3

[56] References Cited

U.S. PATENT DOCUMENTS

| | | | |
|---|---|---|---|
| 2,237,897 | 4/1941 | Vas | 43/2 |
| 2,893,154 | 7/1959 | McKee | 43/3 |
| 3,029,541 | 4/1962 | Palmer | 43/3 |
| 3,432,581 | 3/1969 | Rosen | 446/385 |
| 3,456,046 | 7/1969 | Rosen | 446/385 |
| 4,251,937 | 2/1981 | Curley | 43/3 |
| 4,318,240 | 3/1982 | Hillesland | 43/3 |
| 4,550,518 | 11/1985 | Layson | 43/2 |
| 4,643,434 | 2/1987 | Carlin | 273/408 |

OTHER PUBLICATIONS

Ethafoam Animal Targest, 9—1984, 4 pages.

Primary Examiner—M. Jordan
Attorney, Agent, or Firm—David W. Anderson

[57] ABSTRACT

A hunting decoy which may be either a single silhouette figure or a full three dimensional figure consisting of a number of assembled silhouette portions is manufactured of a flexible, thermoformable, closed-cell expanded polyethylene foam which is cross-linked by an irradiation process. The decoys are light in weight, collapsible, impervious to weather and life-like in appearance.

3 Claims, 1 Drawing Sheet

HUNTING DECOY

BACKGROUND OF THE INVENTION

1. Field of the Invention

The present invention relates generally to the field of hunting and particularly to decoys used for hunting.

2. Description of the Prior Art

When hunting for game such as deer, antelope and elk it is necessary to somehow attract the game to the proximity of the hunter so that an advantageous shot may be taken. This is particularly true when the hunter is using a bow and arrow. in the past, many attractants have been employed, such as scents, calls imitating the sounds made by the game and noisemakers which attempt to reproduce, for example, the sounds made by the clashing antlers of male game in combat.

One relatively new attempt at luring land game has been the use of a full-sized decoy. This decoy is a silhouette of the desirable game which is hinged for transportation and incudes a stake which supports the decoy in an upright position. Success of the product is predicted on the fact that the dominant male of the game group will try to separate and drive off any competing males from the remainder of the herd. The theory is then that the largest male of the herd will be incensed by the presence of what is thought to be a competing male and will thus approach the decoy to drive the intruder away. This approach, of course, allows for a clear and close shot by the hunter.

While this decoy theory has been proven effective, there are a number of drawbacks associated with the type of decoy described above. Since the decoy is only a silhouette rather than a complete figure, its simulation of the animal is not very realistic. Also because the figure is merely a silhouette, it is necessary that the hunter erect the decoy after locating and in the presence of the herd, since that is the only time that he can be sure the decoy is facing the correct direction. The hunter must also remain with the decoy to turn the decoy to keep it facing in the proper direction.

Furthermore, The extant decoy is not readily transportable because of its rigid construction and its relatively heavy weight.

SUMMARY OF THE INVENTION

The present invention remedies the drawbacks associated with the above-described silhouette decoys by providing a decoy which is formed of flexible, closed-cell expanded foam which is preferably polyethylene and preferably cross-linked by an irradiation process. This material provides a remarkably life-like appearance, is light weight, has a "memory" which allows the figure to regain its shape after storage, is impervious to weather and allows manufacture by economical processes.

One form of the decoy is a silhouette of the game from a particular view, such as a view from above of a bird just prior to landing. In such a case, the light weight of the polyethylene foam allows the decoy to flutter in a slight breeze for a more realistic appearance.

Another form of the invention is two or more portions of a game animal, such as bilateral half portions of a deer, which when connected form an entire three dimensional figure. Each bilateral half may and preferably does include a rib extending around the periphery to allow connection of the halves to each other and to provide stiffness to each portion.

In either embodiment, the flexible nature of the foam material allows the respective decoy to be compactly folded or crushed for transporation and the quality of the material which causes it to attempt to regain its original shape permits the decoy to be redeployed without evidence of storage such as wrinkles or creases.

BRIEF DESCRIPTION OF THE DRAWINGS

The present invention will be more particularly described with reference to the accompanying drawing, wherein like numbers refer to like parts in the several views, and wherein.

DESCRIPTION OF THE PREFERRED EMBODIMENTS

Figure 1:
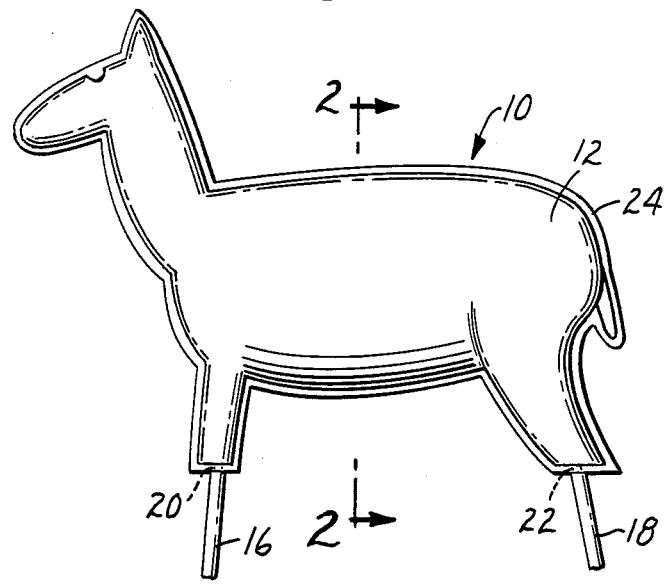
FIG. 1 is a side elevational view of a first embodiment of a decoy according to the present invention.
Figure 2:
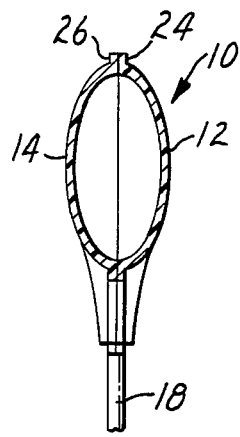
FIG. 2 is a cross-sectional view of the decoy of FIG. 1 taken generally along the line 2—2 of FIG. 1.

With reference to FIGS. 1 and 2, there is shown a first embodiment of a decoy according to the present invention, generally indicated as 10, which is a general representation of a game animal and which includes two bilateral halves 12 and 14 and two support stakes 16 and 18. The support stakes extend through holes 20 and 22 formed in the legs of the decoy 10.

Each bilateral half 12 and 14 includes a planar rib 24 and 26 extending outwardly from and around the complete perimeter of each half 12 and 14. These ribs 24 and 26 allow the two halves 12 and 14 to be connected, as by sewing, a pressure-sensitive adhesive, welding, ultrasonic welding or the like. The ribs 24 and 26 also add stiffness to each bilateral half 12 and 14 and the composite structure of the decoy 10.

The halves 12 and 14 of the decoy 10 are vacuum or pressure thermoformed of a flexible, closed-cell expanded foam, and preferably a polyethylene foam which is cross-linked by an irradiation process. Such a polyethylene foam is available in 1987 from Voltek, Inc., 100 Shepard Street, Lawrence, Mass. under the trade name Volara Type A. While many closed-cell foams will work adequately, the foam described above is preferred because the cross-linking process produces a foam which has a leather-like surface feel and appearance.

It has been found that a material thinkness of between about 0.80 mm and 19.00 mm functions acceptably, with a preferred thickness of about 3.20 mm providing a workable compromise between structural rigidity and compactness during transportation and storage.

Although FIGS. 1 and 2 depict a figure which is formed of two halves 12 and 14, it will be recognized that any number of parts could be used and assembled to form the final FIG. 10.

Figure 3:
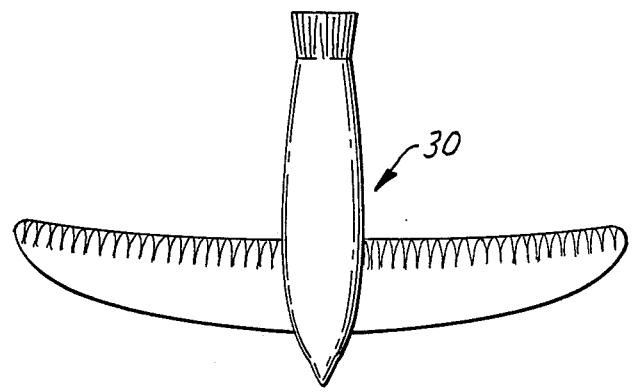
FIG. 3 is a top plan view of a second embodiment of a decoy according to the present invention.
Figure 4:
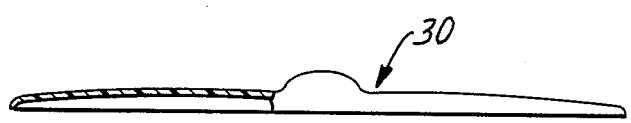
FIG. 4 is a front elevational view, partially in cross-section, of the decoy of FIG. 3.

FIGS. 3 and 4 illustrate a second embodiment of a decoy 30 according to the present invention which is formed as only a silhouette of the game animal rather than the full figure as is the case with the embodiment of the decoy 10 shown in FIGS. 1 and 2. The embodiment of FIGS. 3 and 4 is particularly suited for game decoys 30 which will primarily viewed from above by the game it is desired to attract. This usually means that such a decoy 30 will primarily be formed to resemble birds such as geese or ducks.

The decoy 30 is manufactured of the same materials as the decoy 10, although the thickness will preferably be toward the low side of the given range, so that the figure may be easily moved by a relatively slight breeze to attract the desired bird. The decoy 30 is formed from a single sheet of polyethylene foam in the same manner as is used to form each half 12 and 14 of the decoy 10. Although the decoy 30 could be formed with a stiffening rib, such as the ribs 24 and 26 of the decoy 10, such a rib has not been found to be necessary.

Thus there has been described a decoy 10 or 30 which is light weight, easily collapsible for transportation, impervious to weather and life-like in appearance.

Although only two embodiments have been described, it will be understood that many modifications will be apparent to one skilled in the art. For example, any animal it is desired to hunt could be formed, such as turkeys, in addition to those illustrated. It should also be recognized that the invention is not limited to game figures. A light weight and storable mannequin is one illustrative possibility.

I claim:

1. A figure particularly useful in hunting to simulate and lure game to the proximity of the figure comprising:
    at least two silhouette portions formed of flexible, thermoformable, closed-cell expanded foam which when joined simulate substantially the complete exterior shape of said figure; and
    a planar rib projecting from each of said portions and around the periphery of said portions for connection of one portion to another and stiffness of said portions.

2. A figure according to claim 1 further including at least one hole and at least one rod for insertion into said hole to provide support for said figure.

3. A figure according to claim 1 wherein said foam is polyethylene and is cross-linked by an electron irradiation process.

* * * * *